United States Patent
Robinson

(10) Patent No.: US 7,240,191 B2
(45) Date of Patent: Jul. 3, 2007

(54) METHOD AND APPARATUS FOR INITIALIZING SECURITY INFORMATION ON A NETWORK DEVICE

(75) Inventor: Michael C. Robinson, Roseville, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 867 days.

(21) Appl. No.: 10/062,382

(22) Filed: Feb. 1, 2002

(65) Prior Publication Data

US 2003/0149892 A1 Aug. 7, 2003

(51) Int. Cl.
*H04L 9/00* (2006.01)

(52) U.S. Cl. .......................... 713/151; 726/2; 380/278

(58) Field of Classification Search ........ 713/200–201, 713/165–167; 380/228–229, 232, 28–30, 380/202, 279, 281–285; 726/1–7, 14, 17–19, 726/21, 27, 30; 709/100, 200, 203, 223–225, 709/227–229
See application file for complete search history.

(56) References Cited

U.S. PATENT DOCUMENTS

| | | | | |
|---|---|---|---|---|
| 5,548,649 A | * | 8/1996 | Jacobson | 713/153 |
| 6,044,154 A | * | 3/2000 | Kelly | 713/155 |
| 6,044,468 A | * | 3/2000 | Osmond | 726/5 |
| 6,189,100 B1 | | 2/2001 | Barr et al. | |
| 6,324,646 B1 | * | 11/2001 | Chen et al. | 726/6 |
| 6,366,578 B1 | * | 4/2002 | Johnson | 370/353 |
| 6,751,729 B1 | * | 6/2004 | Giniger et al. | 713/153 |
| 6,775,828 B2 | * | 8/2004 | Feinleib et al. | 717/173 |
| 6,795,862 B1 | * | 9/2004 | Keohane et al. | 709/230 |

FOREIGN PATENT DOCUMENTS

WO WO0124444 A2 4/2001
WO WO0207116 A1 1/2002

OTHER PUBLICATIONS

Microsoft Computer Dictionary, 2002, Microsoft Press, 5th Edition, pp. 192 & 266.*

* cited by examiner

*Primary Examiner*—Kim Vu
*Assistant Examiner*—Leynna Ha

(57) ABSTRACT

A method and apparatus for initializing security information for a network device. Two protocols are used. A first protocol, which has no encryption capability, is used to create an initial account. However, the initial account corresponds to a second protocol, and this second protocol does have encryption capability. A security parameter which is used to encrypt data and which corresponds to the initial account is transmitted by the network device to the network management application. The security parameter may be transmitted from the network device to the network management application openly via the first protocol. The network management application then uses this security parameter to encrypt sensitive security information needed for initially configuring the network device. The encrypted security information can now be transmitted securely over the network to the network device by means of the second protocol. Thereby, the network device can be initially configured with the requisite security information in an easy-to-use and relatively secure manner.

16 Claims, 6 Drawing Sheets

METHOD AND APPARATUS FOR INITIALIZING SECURITY INFORMATION ON A NETWORK DEVICE

TECHNICAL FIELD

The present invention pertains to a method and apparatus for initializing security information on a network device.

BACKGROUND OF THE INVENTION

Businesses and individuals rely upon data networks for communications and the exchange of information. Today, personal computers, mobile computing computing devices, personal data units, servers, storage devices, and printers are either directly or wirelessly connected to local area networks (LANs). These LANs, together with metropolitan area networks (MANs), wide area networks (WANs), and the Internet enable users to readily gain access to, exchange, download, and archive data of all types (e.g., sound, text, numerical data, video, graphics, multi-media, etc.) from other networked computers, databases, and websites.

In order to communicate over a network, a device coupled to the network typically includes a network transceiver which transmits data packets generated by the networked device over the network and which also receives data packets destined for that network device from the network. For example, a printer can be coupled to a network by installing an internal network card (e.g., JetDirect™ manufactured by Hewlett-Packard™). By installing a network card, the printer is no longer dedicated to a single PC. Anyone coupled to the network can potentially use that network printer to print his or her documents.

When a device is coupled to a network, the network device must initially be properly configured and then subsequently managed and monitored. This task is often accomplished through the use of specialized network management software. A widely accepted protocol adopted by many network management software is known as the Simple Network Management Protocol (SNMP). SNMP refers to a simple request/response protocol that communicates management information between two types of SNMP software entities: SNMP applications (also known as SNMP managers) and SNMP agents. Typically, SNMP applications run in a network management station and issue queries to gather information about the status, configuration, and performance of external network devices (commonly referred to as network elements). Meanwhile, SNMP agents run in network elements and respond to network management station queries. In addition, agents send unsolicited reports back to the network management station when certain network activity occurs.

For security reasons, the SNMP agent validates each request from an SNMP manager before responding to the request, by verifying that the manager belongs to an SNMP community which has the proper access privileges to the agent. By definition, an SNMP community establishes a logical relationship between an SNMP agent and one or more SNMP managers. The community has a name, and all members of a community have the same access privileges: either read-only (i.e., members can view configuration and performance information) or read-write (i.e., members can view configuration and performance information, and also change the configuration. All SNMP message exchanges consist of a community name and a data field, which contains the SNMP operation and its associated operands. The SNMP agents are typically configured to receive requests and send responses only from managers that are members of a known community. If the agent knows the community name in the SNMP message and knows that the manager generating the request is a member of that community, it considers the message to be authentic and gives it the access allowed for members of that community. In theory, the SNMP community prevents unauthorized managers from viewing or changing the configuration of a network device.

Unfortunately, in SNMPv1, the community name is broadcast over the network in plain text. This poses a serious security risk because unauthorized parties can snoop, sniff, trace, or otherwise intercept and obtain the unencrypted, plain text community name during startup, configuration, or any general communication between the manager and agent. Once the community name is exposed, the entire network is susceptible to being hacked, corrupted, and having its sensitive, proprietary data contained thereon compromised.

In an effort to close this serious security flaw inherent with SNMPv1, some vendors have resorted to implementing default accounts for the purposes of initializing security parameters. But hackers can nonetheless, reverse engineer from default accounts, any new accounts or modifications. Indeed, such default account schemes actually increase the vulnerability of network security were default security accounts to be hard-coded into a network device. Other vendors have attempted to control access by implementing an access control list which only provides set access control information based on the IP address of known, authorized clients. However, this approach fails to prevent unauthorized parties from spoofing or fraudulently assuming the IP address of an authorized client and gaining access thereby. Another prior art approach entails the use of a Secure Socket Layer (SSL). Although SSL provides a relatively high level of security, it is quite cumbersome to set up and requires a high degree of sophistication and specific, technical know-how to put in place. In another prior art approach, vendors have provided network devices with point-to-point interfaces, such as a terminal or USB connector, designated to configure accounts. Adding physical interfaces for this purpose increases that product's costs, which is disadvantageous. Another similar prior art approach entails using a front panel display to configure accounts. Again, this prior art approach is not ideal because the front panel space is limited; besides which, it adds cost, complexity, and is overly cumbersome.

Therefore, there is a need in the prior art for a method and apparatus for initializing security information on a network device. It would be highly preferable if such a method and apparatus could improve network security and yet be cost-effective and easy to use and implement. The present invention provides unique, novel solutions which meet these needs.

SUMMARY OF THE INVENTION

The present invention pertains to a method and apparatus for initializing security information for a network device. Two protocols are used. A first protocol, which has no encryption capability, is used to create an account. However, the account corresponds to a second protocol, and this second protocol does support encryption. A security parameter which is used to encrypt data and which corresponds to the account is transmitted by the network device to the network management application. The security parameter may be transmitted from the network device to the network management application openly via the first protocol. The network management application then uses this security parameter to encrypt sensitive security information needed for initially configuring the network device. The encrypted security information can now be transmitted securely over the network to the network device by means of the second protocol. Thereby, the network device can be initially configured with the requisite security information in an easy-to-use and yet relatively secure manner.

BRIEF DESCRIPTION OF THE DRAWINGS

The accompanying drawings, which are incorporated in and form a part of this specification, illustrate embodiments of the invention.

DETAILED DESCRIPTION OF THE INVENTION

A method and apparatus for initializing security information on a network device is described in detail. According to one embodiment of the present invention, a network device is configured via a temporary initial SNMPv3 user account. Basically, a temporary initial SNMPv3 account is used to encrypt sensitive security information for configuring network devices over a network. This configuration via a temporary SNMPv3 user account provides a method of configuring network devices over a network by using the temporary initial SNMPv3 account to encrypt sensitive security information. The initial account has two forms: initial SNMP Account Objects which entails the use of unsecure SNMPv3 user account information used to initially set up the account, and the actual SNMPv3 User Account which enables subsequent SNMPv3 network access in a much more secure environment.

Figure 1:
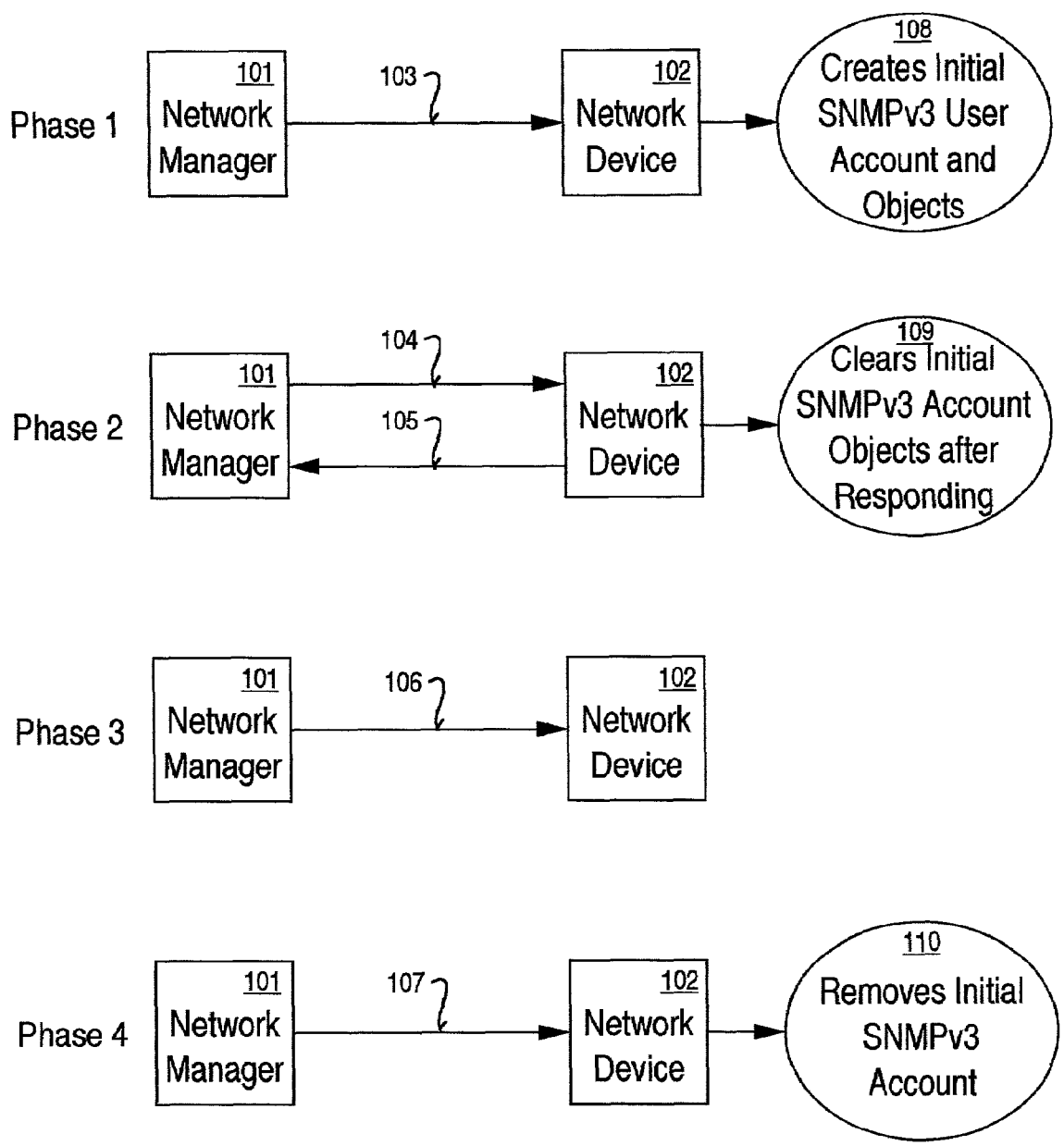
FIG. 1 shows a process for configuring network devices over a network by using a temporary initial SNMPv3 user account according to one embodiment of the present invention.

Referring to FIG. 1, a process for configuring network devices over a network by using a temporary initial SNMPv3 user account according to one embodiment of the present invention is shown. In phase 1, a network manager 101 contacts a network device 102. Network manager 101 includes any type of management application which can run on a dedicated network management station or reside anywhere else on the network. Network device 102 can be an actual computing device coupled either directly or wirelessly to the network. Some examples of network devices include personal computers, personal digital assistants, portable computing devices, laptops, servers, terminals, mainframes, tablets, printers, storage units, etc. Network device 102 can also represent network cards installed within or as part of a device to enable that device to communicate over the network. The network manager 101 instructs the network device 102 to create an initial SNMPv3 account. This is represented as process flow 103. The SNMPv3 account is created by means of SNMPv1. Basically, the SNMP protocol has evolved into different versions. The initial version of SNMP is referred to as the Simple Network Management Protocol version 1 (SNMPv1). The SNMPv1 protocol enables a network manager station to configure, monitor, and receive trap messages from network devices. An update to SNMPv1 is commonly referred to as the Simple Network Management Protocol version 2 (SNMPv2). The SNMPv2 protocol provides additional administrative structure, authentication, and privacy features. SNMPv2 was followed by Simple Network Management Protocol version 3 (SNMPv3). SNMPv3 is an update of version 2 that provides additional security and administrative capabilities. In response, the network device 102 creates an initial SNMPv3 user account and corresponding objects, as shown in process flow 108.

In phase two, the network manager 101 requests the network device 102 for the initial SNMPv3 account objects, as represented by process flow 104. The network device 102 returns the initial SNMPv3 account objects via an SNMPv1 protocol. This is represented by process flow 105. After responding to the network manager's request, the network device 102 clears the initial SNMPv3 account, process flow 109. It should be noted that the first two phases are accomplished in SNMPv1 for ease-of-use. As such, the network traffic is conducted in plain text. Although the plain text transmissions are subject to unauthorized interception, the data contained therein is used for creating the initial SNMPv3 user account. Once the initial SNMPv3 user account is created, subsequent communications can be conducted in a more secure manner. This is due to the fact that SNMPv3 includes inherent authorization and encryption capabilities.

In phase three, the network manager 101 configures the security parameters with respect to the network device 102. The process flow 106 for configuring the security parameters associated with network device 102 is performed in an authenticated, encrypted manner via SNMPv3. The configuration is no longer susceptible to plain text interception by unauthorized parties.

In phase four, the network manager 101 issues a command 107 to the network device 102. The command instructs the network device 102 to destroy the initial SNMPv3 account. This command is transmitted in a secure SNMPv3 mode of operation. In response to this command, the network device 102 removes the initial SNMPv3 account, as indicated by process flow 110, thereby eliminating a potential security risk. Henceforth, network communications will be conducted in a secure, authenticated, and encrypted manner according to the security parameters configured in phase three above.

Figure 2:
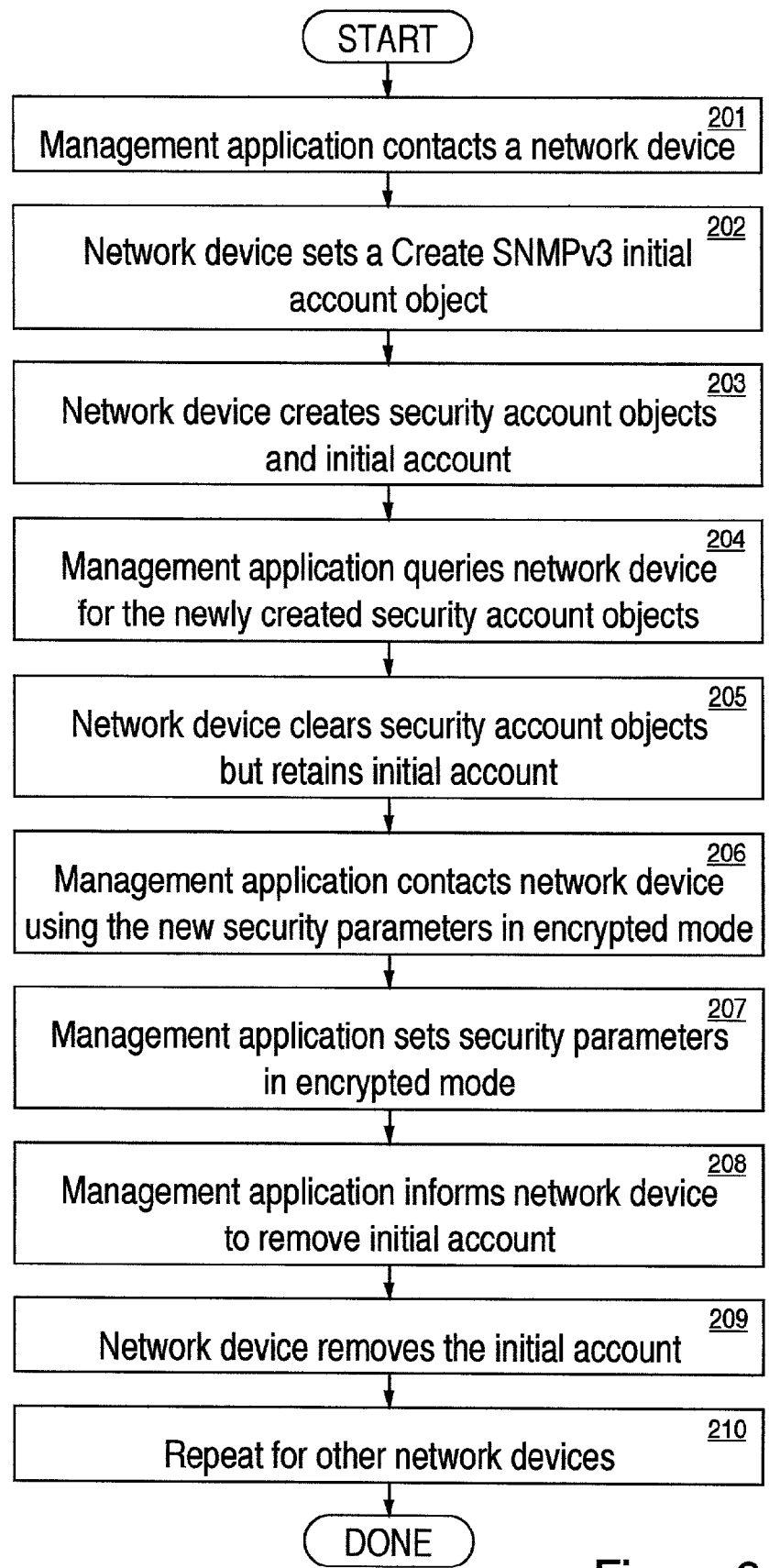
FIG. 2 is a flow chart describing the steps for initializing security information on a network device according to one embodiment of the present invention.

FIG. 2 is a flow chart describing the steps for initializing security information on a network device according to one embodiment of the present invention. When a network device is first installed, the management application contacts that network device in order to configure it, step 201. The network device is instructed to set a Create SNMPv3 initial account object, step 202. In step 203, the network device creates random security parameters for SNMPv3 encryption and authentication keys. An initial account and the securit account objects are also created in step 203. In one embodiment, the initial account objects include but are not limited to the user, authentication key, privacy key, and context. Next, the management application queries the network device for the newly created security initial objects, step 204. After responding to the management application's queries for the initial security account objects, these objects are cleared, step 205. However, it should be noted that the initial SNMPv3 account is still retained. The management application then contacts the network device using the new security parameters in an encrypted mode, step 206. The management application sets security parameters in encrypted mode in step 207. At this point, the management application informs the network device to remove, delete, or destroy the initial account, step 208. And the network device can now remove the initial account, step 209. It should be noted that steps 208 and 209 are optional; they serve to close a potential security risk. This process as described in steps 201–209 can be repeated each time a new network device needs to be initially configured, step 210.

By configuring a new network device using a temporary initial SNMPv3 account via SNMPv1, the network administrator's task is greatly reduced. Presumably, the network administrator has had previous working experience and is familiar with SNMPv1 tools and functions. Rather than having to learn the complexities associated with SNMPv3, the network administrator can initially configure the network device in a manner that he or she is already familiar with. This ease-of-use during installation of new network devices on a LAN is a valuable feature. If the initial installation process is relatively straightforward, customers are likely to select network products of one manufacturer over that of another. It is likely that customers will continue to purchase products from the preferred manufacturer and may purchase more products from that particular manufacturer because the learning curve and time for getting up-to-speed on the products' operations are minimized. Furthermore, products which are easy to install have lower costs for customers. As such, customers may be willing to pay more initially to purchase the product because it will reduce the customers' cost to install and operate such products.

Figure 3:
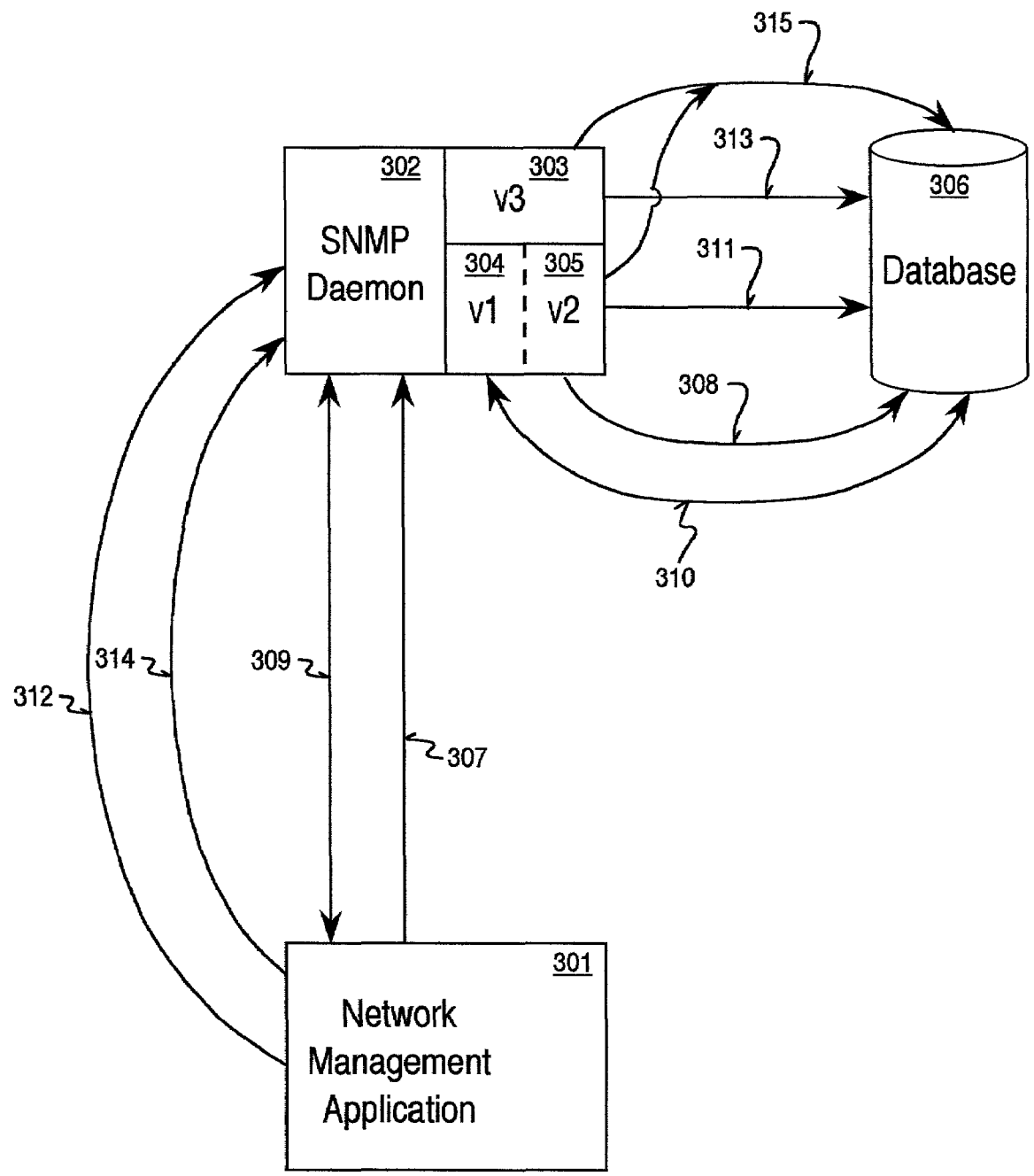
FIG. 3 shows an architectural overview of the process flow according to one embodiment of the present invention.

FIG. 3 shows an architectural overview of the process flow according to one embodiment of the present invention. In this embodiment, a network device is configured by using a network management application 301 in conjunction with an SNMP daemon 302, SNMPv1 304, SNMPv2 305, SNMPv3 303 and database 306. When a device is initially coupled to the network, the network management application 301 is either notified or detects this event. Network management application 301 is a piece of software responsible for managing the overall network. It can reside anywhere on the network so long as it has access to the network. One function of the network management application 301 is to configure a new network device. This is accomplished by first creating an initial user account. The initial user account is an SNMPv3 account. Process flow 307 represents network management application 301 issuing a command to the SNMP daemon 302 to create the initial SNMPv3 user account. The SNMP daemon 302 is a core software engine used to perform the basic SNMP functions. The initial SNMPv3 user account is created by the SNMPv1 process 304. It should be noted that the dashed line separating SNMPv1 304 and SNMPv2 305 indicates that either of these two (v1 or v2) can be used interchangeably for purposes of practicing one embodiment of the present invention. As shown by process flow 308, the SNMPv1 process 304 writes this initial SNMPv3 user account information to database 306. Database 306 is a piece of software running on a memory storage unit coupled to the network, upon which data can be written to, retained, and subsequently retrieved.

After the initial SNMPv3 user account has been created, the network management application 301 retrieves the initial SNMPv3 account information, as represented by process flow 309. This is accomplished by the network management application 301 issuing a request to the SNMP daemon 302. In response, the SNMP daemon causes the SNMPv1 process 304 to read the initial SNMPv3 account information from database 306. Process flow 310 represents the SNMPv1 process issuing a read request to database 306, and database 306 returning the requested information back to SNMPv1. The SNMP daemon 302 then sends this information to the network management application 301. Thereupon, the SNMPv1 process 304 causes the copy of the account objects residing in database 306 to be cleared. This prevents unauthorized parties from gaining access to those account objects.

Once the network management application 301 has the initial SNMPv3 account information, it can configure the network device in a secure environment over the network. In other words, the configuration of the network device can proceed in an authenticated, encrypted procedure. Process flow 312 represents the network management application 301 configuring the network device via the SNMP daemon 302. According to process flow 312, the network management application 301 sends the security parameters in an encrypted mode over the network. These security parameters include anything related to security and/or authorization, such as passwords, user authentications, access lists, user keys, authentication keys, privacy keys, context, 802.11 access point keys, encryption/decryption data, registration data, etc.). Because the transmission of sensitive security parameters is encrypted, a higher degree of protection is afforded. The SNMPv3 process 303 stores this sensitive security information in database 306, as shown by flow process 313.

At this point, there is no need to keep the initial account. The initial SNMPv3 account may now be eliminated. This prevents an unauthorized party from accessing the initial SNMPv3 account with malicious intent. Process flow 314 represents the network management application 301 instructing the SNMP daemon 302 to delete the initial SNMPv3 account. Any of the SNMPv1, SNMPv2, or SNMPv3 processes 303-305 can direct database 306 to erase the initial SNMPv3 account. The network device in now properly configured. Future communications between the network management application 301 and the network device can be carried out in either SNMPv1, SNMPv2, or SNMPv3.

Figure 4:
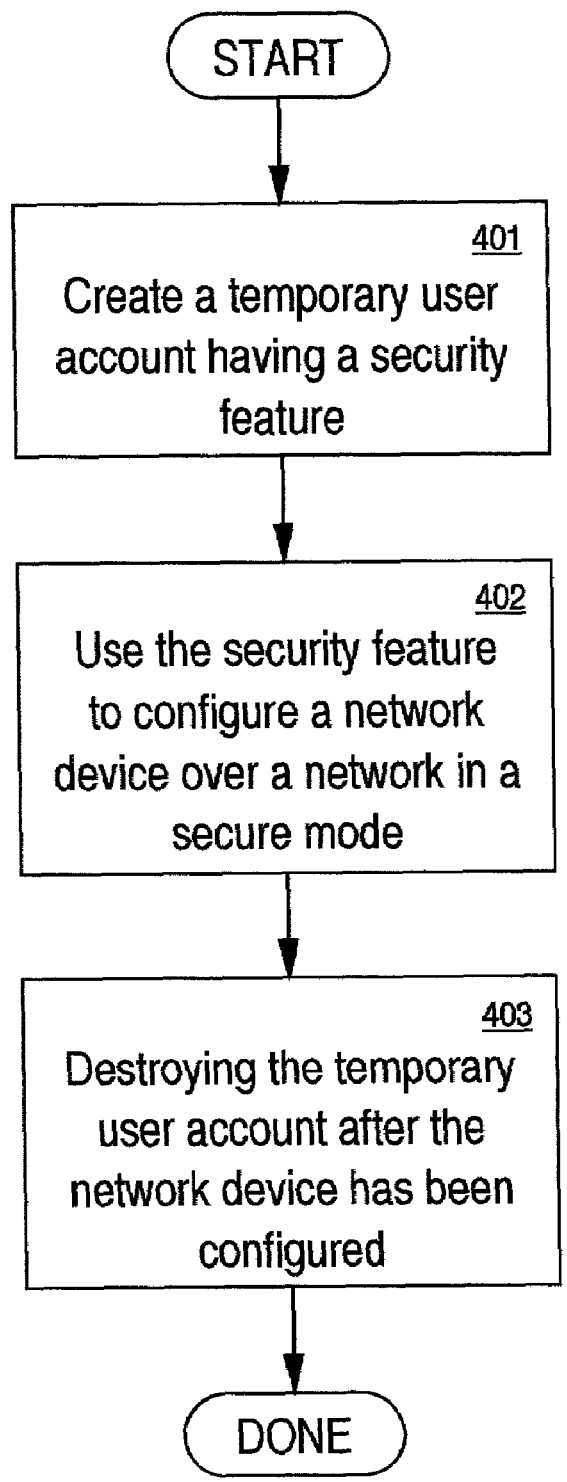
FIG. 4 shows a flow chart describing the basic steps for initializing a network device over a network in accordance with one embodiment of the present invention.

It should be noted that whereas the embodiments of the present invention described above are in reference to the SNMP protocol, it would be appreciated that other protocols could be used in other embodiments of the present invention. For example, FIG. 4 shows a flow chart describing the basic steps for initializing a network device over a network in accordance with one embodiment of the present invention. Initially, a temporary user account having a security feature is created, step 401. The security feature is used to configure a network device over the network in a secure mode, step 402. After the network device has been properly configured, the temporary user account is destroyed (e.g., the temporary user account and all of its associated account objects and data are erased from memory and no longer exists), step 403.

Figure 5:
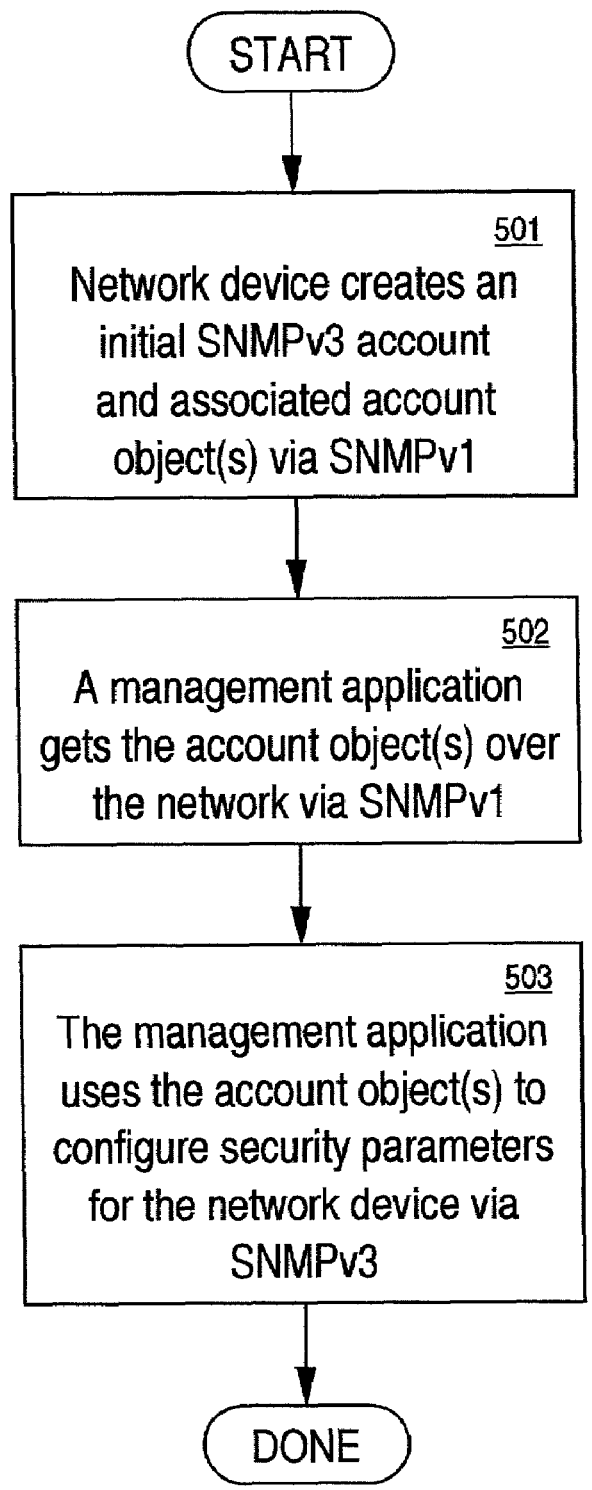
FIG. 5 is a flowchart of one alternative embodiment of the present invention.

While the preferred embodiment has been disclosed, it should be noted that the present invention includes alternative embodiments. FIG. 5 shows a flowchart of one alternative embodiment. In step 501, a network device creates an initial SNMPv3 account and one or more associated account object(s). This account is created by means of using the SNMPv1 protocol. In step 502, a management application gets the account object(s) over the network via SNMPv1. In step 503, the management application then uses the account object(s) to configure security parameters for the network device via SNMPv3.

Figure 6:
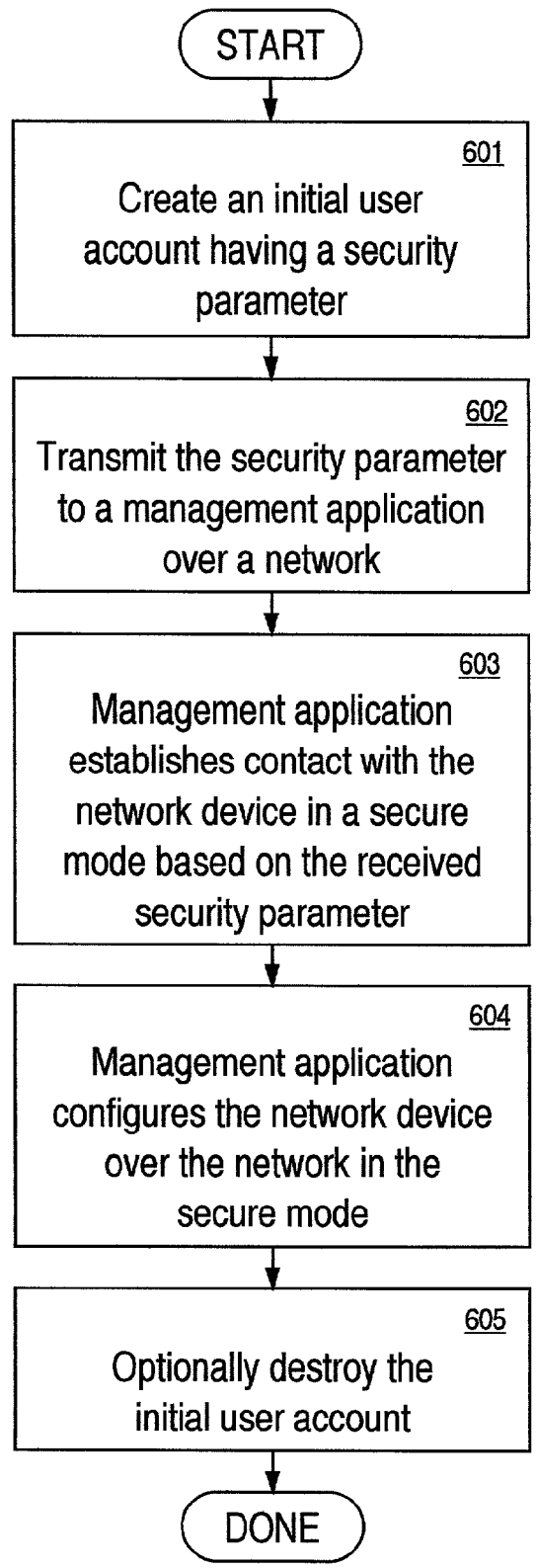
FIG. 6 is a flowchart describing the steps of another embodiment of the present invention.

FIG. 6 is a flowchart describing the steps of another embodiment of the present invention. In step 601, and initial user account having a security parameter (e.g., encryption key) is created. The security parameter is transmitted over the network to a management application in step 602. The management application then establishes contact with the network device over the network in a secure mode of communications (e.g., encrypted) based on the received security parameter, step 603. While in the secure mode of communications, the management application can more securely configure the network device over the network, step 604. After the network device has been properly configured, the initial user account can optionally be destroyed, step 605.

Thus, the preferred embodiment of the present invention, a method and apparatus for initializing security information on a network device, is described. It should also be noted that the present invention encompasses the use of other types of networking protocols, security measures, and/or configuration schemes. While the present invention has been described in particular embodiments, it should be appreciated that the present invention should not be construed as limited by such embodiments, but rather construed according to the below claims.

What is claimed is:

1. A method for a network manager to securely configure a network device over a network, comprising:
    coupling to said network device;
    creating a temporary account having an encryption key, wherein an unsecured first protocol is used to create said temporary account, wherein said temporary account corresponds to a secured second protocol that supports encryption, and wherein said secured second protocol is capable of transmitting encrypted security information;
    transmitting said encryption key unencrypted to said network manager over said network in accordance with said unsecured first protocol;
    encrypting said security information using said encryption key;
    transmitting encrypted security information over said network to said network device in accordance with said secured second protocol;
    initializing said network device with said security information;
    deleting said temporary account after said network device has been initialized with said security information; and
    clearing said encryption key after said encryption key has been sent to said network manager over said network.

2. The method of claim 1, wherein said unsecured first protocol comprises SNMPv1 and said second protocol comprises SNMPv3.

3. The method of claim 1 further comprising:
    authenticating transmissions over said network in accordance with said second protocol.

4. The method of claim 1, wherein said security information includes an 802.11 access point key.

5. The method of claim 1 further comprising:
    creating initial account objects corresponding to said temporary account.

6. The method of claim 5, wherein said initial account objects comprise user, authentication key, privacy key, and context data.

7. The method of claim 6 further comprising clearing said initial account objects after said initial account objects have been transmitted to said network administration application.

8. A method for a network manager to securely configure a network device, comprising:
    coupling to said network device;
    creating a temporary account by using a unsecured first protocol, wherein said temporary account includes an encryption key in accordance with a secured second protocol that supports encryption, and wherein said secured second protocol is capable of transmitting encrypted security information;
    transmitting said encryption key from said network device over said network to said network manager in plain text;
    encoding security information corresponding to said encryption key;
    configuring said network device in an encoded manner with security information, wherein said security information is encoded according to said encryption key and transmitted to said network device in accordance with said secured second protocol;
    clearing said encryption key;
    destroying said temporary account after said network device has been configured.

9. The method of claim 8, wherein said unsecured first protocol corresponds to SNMPv1 and said second protocol corresponds to SNMPv3.

10. The method of claim 8 further comprising:
    creating objects corresponding to said account, wherein said objects include user, authentication key, privacy key, and context corresponding to said account;
    transmitting said objects over said network to said manager in plain text.

11. The method of claim 8, wherein said security information includes an 802.11 access point key.

12. An apparatus for configuring a network device over a network, comprising:
    means for coupling to said network device;
    means for creating a temporary account having an encryption key, wherein an unsecured first protocol is used to create said temporary account, wherein said temporary account corresponds to a secured second protocol that supports encryption, and wherein said secured second protocol is capable of transmitting encrypted security information;
    means for transmitting said encryption key to a network manager over said network in accordance with said unsecured first protocol;
    means for encrypting transmissions from said network manager to said network device according to said encryption key;
    means for initializing said network device with said security information by said network manager over said network in an encrypted mode in accordance with said secured second protocol;
    means for clearing said encryption key;
    means for destroying said temporary +account after said network device has been configured.

13. The apparatus for configuring a network device of claim 12, further comprising:
    means for authenticating transmissions from said network manager to said network device in accordance with said second protocol.

14. The apparatus of claim 13, wherein said unsecured first protocol comprises SNMPv1 and said second protocol comprises SNMPv3.

15. A computer-readable medium having stored thereon instructions for configuring a network device over a network, comprising:

coupling to said network device;

creating a temporary SNMPv3 account by using SNMPv1, wherein said SNMPv3 accounts includes an encryption key in accordance with said SNMPv3 protocol that supports encryption, and wherein said secured SNMPv3 protocol is capable of transmitting encrypted security information;

transmitting an object corresponding to said temporary SNMPv3 account over said network by using SNMPv1;

encrypting said encryption key according to said object;

transmitting said encryption key to said network device;

configuring said network device with said encryption key by using SNMPv3; and destroying said initial SNMPv3 account after said network device has been configured.

16. The computer-readable medium of claim 15, wherein said security parameter comprises an 802.11 access point key.

\* \* \* \* \*

UNITED STATES PATENT AND TRADEMARK OFFICE
CERTIFICATE OF CORRECTION

PATENT NO.         : 7,240,191 B2                                     Page 1 of 1
APPLICATION NO.    : 10/062382
DATED              : July 3, 2007
INVENTOR(S)        : Michael C. Robinson It is certified that error appears in the above-identified patent and that said Letters Patent is hereby corrected as shown below:

In column 7, line 55, in Claim 2, after "said" insert -- secured --.

In column 7, line 59, in Claim 3, after "said" insert -- secured --.

In column 8, line 27, in Claim 9, after "said" insert -- secured --.

In column 8, line 30, in Claim 10, after "said" insert -- temporary --.

In column 8, line 32, in Claim 10, after "said" insert -- temporary --.

In column 8, line 33, in Claim 10, after "network to said" insert -- network --.

In column 8, line 58, in Claim 12, delete "+account" and insert -- account --, therefor.

In column 8, line 63, in Claim 13, after "with said" insert -- secured --.

In column 8, line 66, in Claim 14, after "said" insert -- secured --.

In column 10, line 9, in Claim 16, delete "security parameter" and insert -- encryption key --, therefor.

Signed and Sealed this

Twelfth Day of May, 2009

JOHN DOLL
*Acting Director of the United States Patent and Trademark Office*